United States Patent [19]

Hagiwara et al.

[11] Patent Number: 5,163,056
[45] Date of Patent: Nov. 10, 1992

[54] APPARATUS FOR CARRYING OUT SERIAL CONTROL

[75] Inventors: Masao Hagiwara; Masakazu Moritoki; Tatsuo Mimura, all of Kanagawa, Japan

[73] Assignee: Kabushiki Kaisha Komatsu Seisakusho, Tokyo, Japan

[21] Appl. No.: 474,091

[22] PCT Filed: Nov. 14, 1988

[86] PCT No.: PCT/JP88/01145
§ 371 Date: May 4, 1990
§ 102(e) Date: May 4, 1990

[87] PCT Pub. No.: WO89/04571
PCT Pub. Date: May 18, 1989

[30] Foreign Application Priority Data

Oct. 1, 1987 [JP] Japan ............................ 62-248889
Nov. 13, 1987 [JP] Japan ............................ 62-286845

[51] Int. Cl.$^5$ ............................................ G06F 11/10
[52] U.S. Cl. ............................ 371/37.1; 370/85.15; 371/20.6
[58] Field of Search ............................ 371/37.1, 20.6; 370/16.1, 85.5, 85.15; 340/825.05, 825.16

[56] References Cited

U.S. PATENT DOCUMENTS 4,390,984 6/1983 Sugiura et al. .................... 371/20.6
4,577,313 3/1986 Sy .................................... 371/37.1

FOREIGN PATENT DOCUMENTS 61-77447 4/1986 Japan.
61-224750 10/1986 Japan.

Primary Examiner—Charles E. Atkinson
Attorney, Agent, or Firm—Diller, Ramik & Wight

[57] ABSTRACT

An apparatus for carrying out serial control includes a single main controller and a plurality of node controllers for directly controlling a variety of sensors and actuators. The node controllers are serially connected to the main controller. The main controller receives a data signal row which is successively transferred through the node controllers and then indirectly and centrally controls sensor data derived from the sensors, as well as actuator control data transmitted to the actuators. Data is transmitted from the data signal row to the sensors or the actuator to be controlled and vice versa in each node controller. An error code is added to the data signal row which is to be transferred to a succeeding port under logic conditions indicating the occurrence of an error. The occurrence of an error is confirmed by inspecting an error check code which is previously added to the data signal row to check whether an error has or has not occurred between the node controllers. The error code for indicating the occurrence of error is added to the data signal row which is inputted into the relevant node controller.

3 Claims, 10 Drawing Sheets

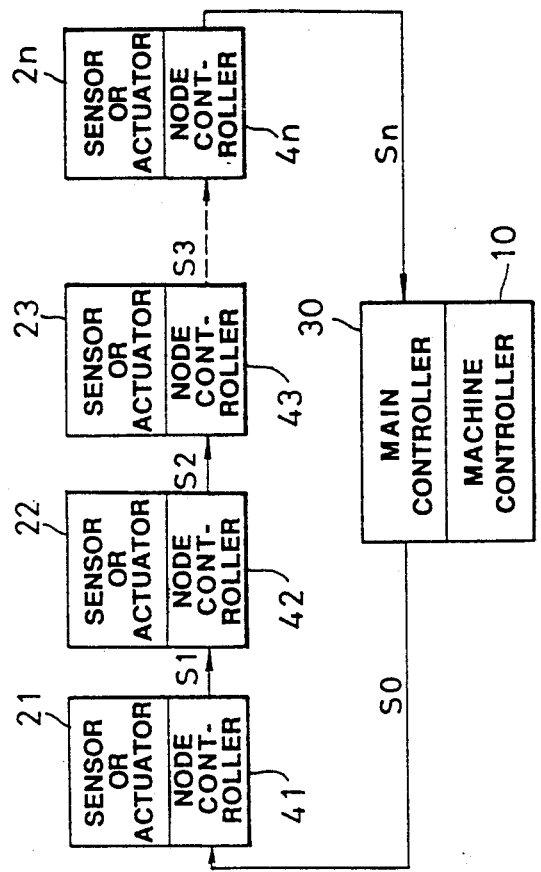
FIG.10
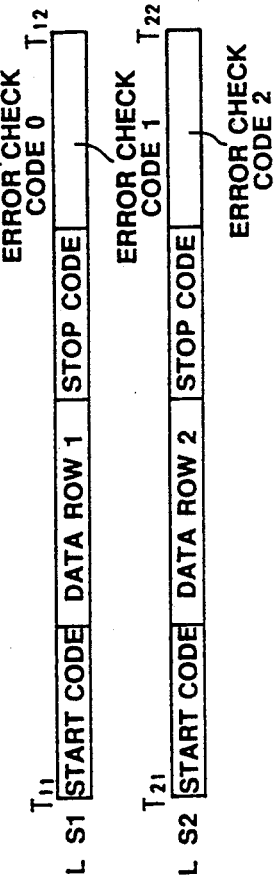
FIG. 11 (a) SIGNAL S0
FIG. 11 (b) SIGNAL S1
FIG. 11 (c) SIGNAL S2

APPARATUS FOR CARRYING OUT SERIAL CONTROL

TECHNICAL FIELD

The present invention relates generally to an apparatus for carrying out serial control wherein the apparatus is preferably employed for centrally controlling a number of various sensors and actuators used for various kinds of industrial machines, numerically controlled machines, unmanned conveying vehicles, robots or the like with the aid of a main controller included in a controller for the purpose of controlling the apparatus. More particularly, the present invention relates to an apparatus for carrying out serial control of the type including a plurality of node controllers corresponding to the sensors and the actuators to directly control them. Each of the node controllers is serially connected to the main controller, wherein structure of each node controller favorably employable for monitoring an occurrence of error between the node controllers as well as a protocol for transmitting signals are practically realized.

BACKGROUND ART

FIG. 10 is a block diagram which schematically illustrates the whole structure of the apparatus of the above-described type for carrying out serial control.

In FIG. 10, reference numeral 10 designates a machine controller serving as a controller for totally controlling a certain machine for which the apparatus is arranged. Reference numerals 21 to 2n designate sensors or actuators disposed in predetermined locations in the machine. Reference numeral 30 designates a main controller disposed adjacent to the machine controller 10 to serve as central controlling means for the sensors or actuators 21 to 2n. Reference numerals 41 to 4n designate node controllers disposed in correspondence to the respective sensors or actuators 21 to 2n to intermediately process various data (sensor data or actuator control data) between the node controllers 41 to 4n and the main controller 30, respectively. Usually, with such an apparatus for carrying out serial control as described above, the main controller 30 and the node controllers 41 to 4n are serially connected to each other in a loop-shaped configuration, as shown in FIG. 10.

FIGS. 11a–11c illustrate by way of example a plurality of protocols for transmitting a series of signals S0 to Sn between the main controller 30 and the node controllers 41 to 4n in the apparatus of the present invention.

Specifically, according to this example, each of the signals S0 to Sn includes a data row comprising a row of sensor data indicative of a sensor output from each sensor or a row of control data indicative of the content of control for controlling a manner of driving each actuator, a start code for indicating the head end of the data row, the start code being located upstream of the data row and having a predetermined logical structure represented by plural bits (e.g., eight bits), a stop code for indicating the tail end of the data row, the stop code being disposed downstream of the data row and likewise having a predetermined logical structure (which is different from the logical structure of the start code) represented by plural bits (e.g., eight bits), and an error check code independently generated at each node controller for the purpose of searching for an occurrence of error between respective ports (between respective node controllers), the error check code being disposed downstream of the stop code to be added as a code signal having a predetermined number of bits (e.g., 16 bits). The main controller 30 and the node controllers 41 to 4n are informed of the presence of data (data row) based on detection of the start code and the stop code. In addition, the main controller 30 and the node controllers 41 to 4n are informed of an occurrence of error based on inspection of the error check code (to be conducted in accordance with a CRC checking process, a vertical/horizontal parity checking process or the like process).

With such latter-described apparatus for carrying out serial control, signals are transmitted between the main controller and the node controllers, whereby transmission of data from the main controller to the node controllers and vice versa, as well as error checking, can effectively be accomplished without fail. However, when an occurrence of error is confirmed and transmitted to a node controller at the next stage or the central main controller 30, the following problems arise depending on the type signals which are transmitted.

The problems will be exemplified below with reference to FIG. 10 and FIG. 11 on the assumption that an error occurs during transmission of signals (data) between a node controller 41 and a node controller 42. Incidentally, $T_{00}$, $T_{01}$, $T_{11}$, $T_{12}$ and $T_{22}$ in FIG. 11 represent a time, respectively.

(1) Case where a series of signals S0 to Sn are transmitted between respective node controllers with time delay equivalent to a length of the respective signals in each node controller, i.e, in the example shown in FIG. 11, the respective times as noted above are set in accordance with a relationship represented by $T_{00} < T_{01} = T_{11}$  $T_{12} = T_{21} < T_{22}$ In this case, e.g., a signal S1 is fully inputted into the node controller 42 from the node controller 41 and it is then delivered to a node controller 43 as a signal S3. Therefore, in this case, the node controller 41 can check an occurrence of error between the node controller 41 and the node controller 42 without fail. Thus, it is possible to undertake a processing as represented, e.g., by the wording "stop outputting of signals", the wording "send a signal for informing an occurrence of error" or the like wording. In this case, however, data delay equivalent to a time ($T_{01} - T_{00}$) is caused between all the node controllers, resulting in substantially reduced data transmission efficiency.

(2) Case where a series of signals S0 to Sn are transmitted without time delay at each node controller, i.e., in the example shown in FIG. 11, the respective times noted above are set in accordance with a relationship represented by $T_{00} = T_{11} = T_{21}$ or $T_{11} < T_{01}$ and $T_{21} < T_{12}$ In this case, e.g., the node controller 42 outputs a signal S2 to the node controller 43 without any interruption, before a signal S1 outputted from the node controller 41 is fully inputted into the node controller 42. Therefore, in this case, the aforementioned time delay can be reduced. On the other hand, when the node controller 42 checks and confirms an occurrence of error between the node controller 41 and the node controller 42, this means that inputting of the signal S2 outputted from the node controller 43 into the node controller 42 has been started or completed. After all, information of the occurrence of error to any one of node controllers located downstream of the node controller 43 can not be carried out satisfactorily. Consequently, there is a high level of possibility that actuators arranged corresponding to node controllers located downstream of the node controller 43 may operate incorrectly or sensors arranged corresponding to any one of node controllers located upstream of the node controller 41 may provide incorrect information.

The present invention has been made with the foregoing background in mind and its object resides in providing an apparatus for carrying out serial control wherein an occurrence of error can reliably be informed to a node controller at the next stage as well as a main controller without reduction of an efficiency for transmitting data.

DISCLOSURE OF THE INVENTION

According to the present invention, each node controller is provided with at least means for adding an error code for informing an occurrence of error to a signal outputted from the node controller under logical conditions that the occurrence of error is confirmed by inspecting an error check code and that the signal inputted into the node controller is added with an error code for informing an occurrence of error.

With such construction, even in a case where signals are transmitted without time delay in a certain node controller, an occurrence of error is confirmed in the node controller based on inspection of the error check code and thereafter signals outputted from all the node controllers are added with an error code, respectively. Consequently, an occurrence of error is reliably informed to all the node controller located downstream of the foregoing node controller and a main controller without reduction of a data transmission efficiency.

BRIEF DESCRIPTION OF THE INVENTION

FIG. 10 is a block diagram which schematically illustrate structure of an apparatus for carrying out serial control to which the present invention is applied.

FIGS. 11a-11c shows a plurality of schematic views each of which illustrates a protocol for transmitting signals wherein the protocol is usually employed for the apparatus in FIG. 10.

BEST MODE FOR CARRYING OUT THE INVENTION

Now, the present invention will be described in detail hereinafter with reference to the accompanying drawings which illustrate preferred embodiments thereof.

Figure 1:
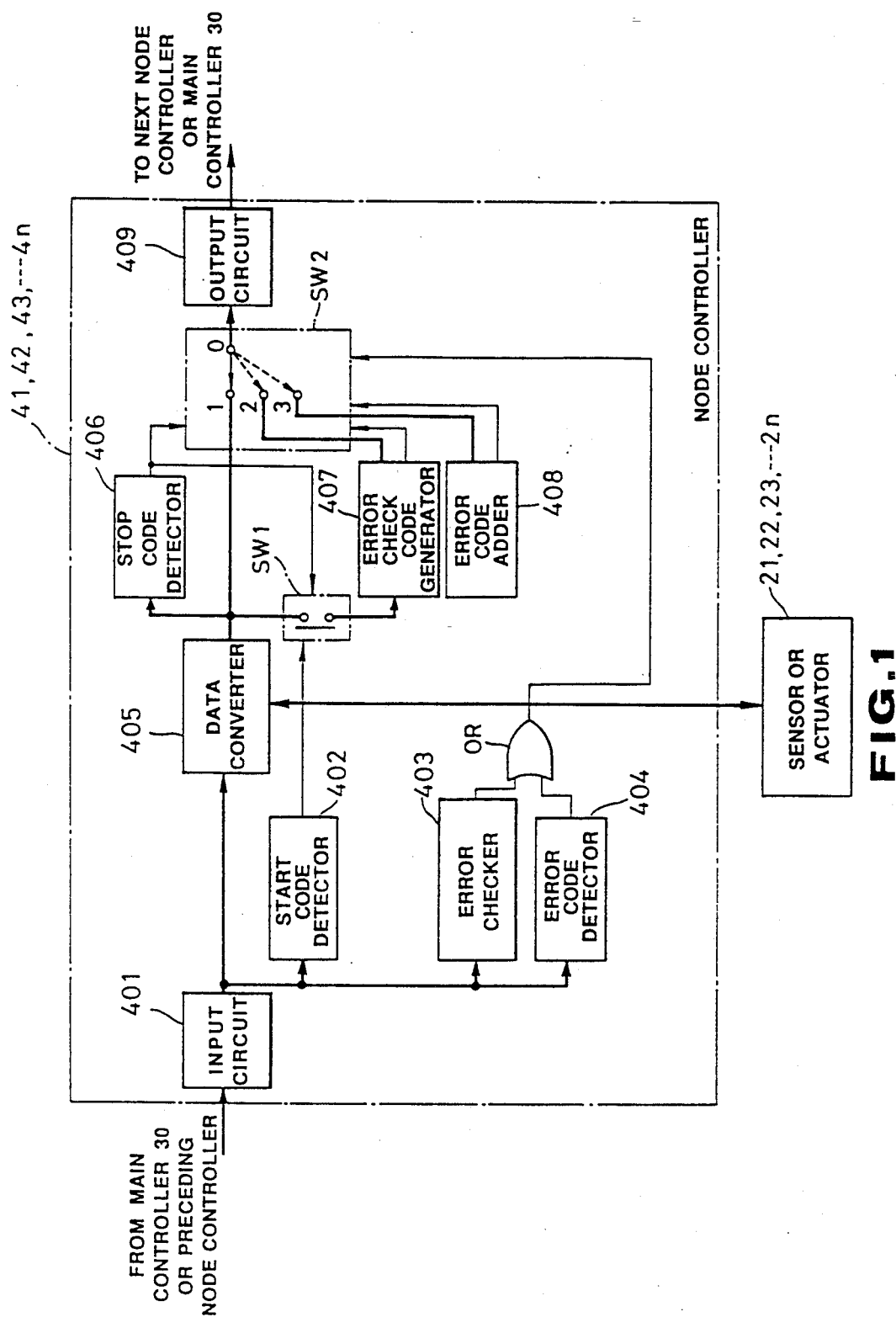
FIG. 1 is a block diagram which schematically illustrates by way of example each node controller for an apparatus for carrying out serial control in accordance with an embodiment of the present invention.
Figure 2:
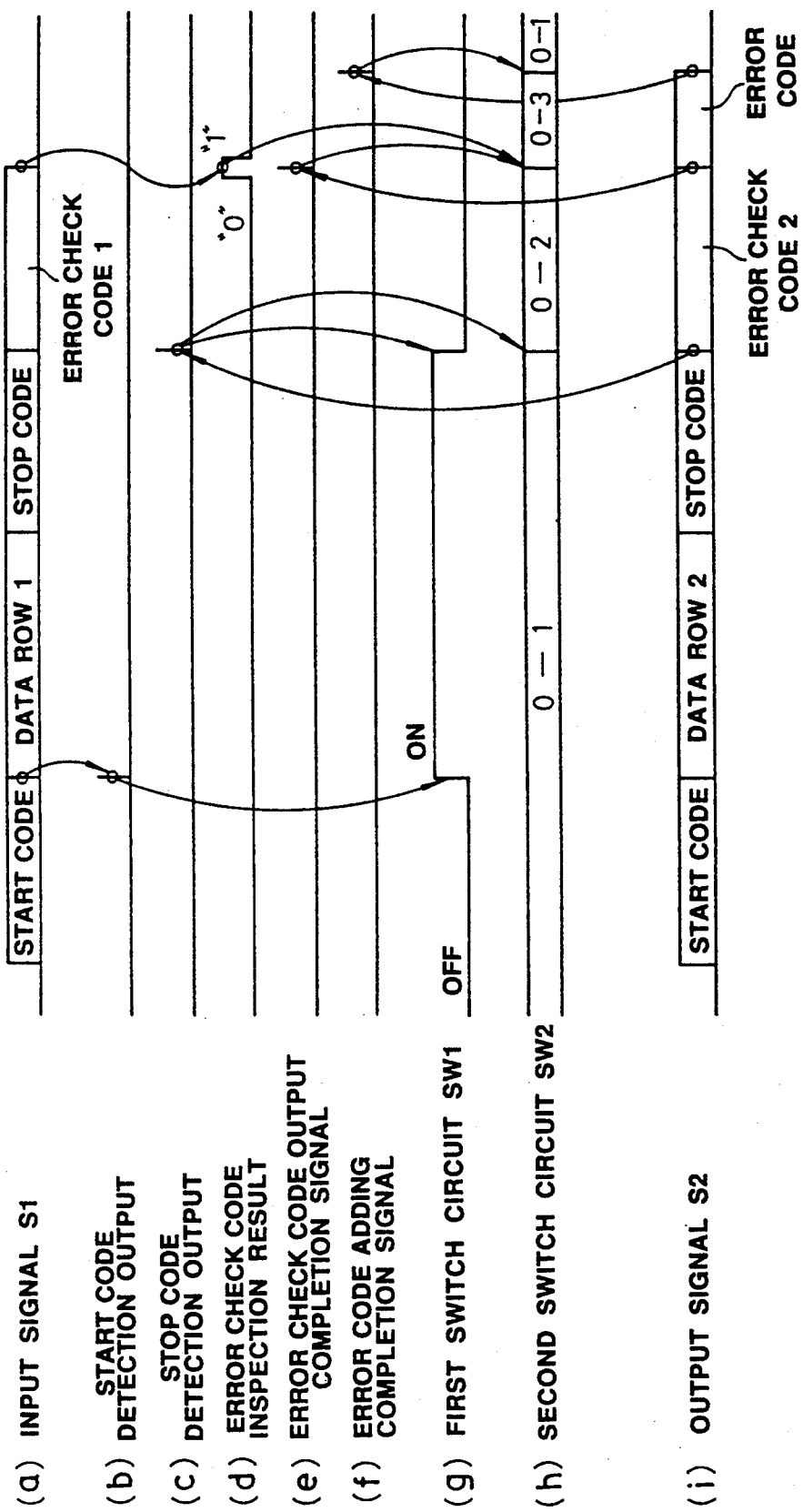
FIG. 2 shows a plurality of timing charts each of which illustrates by way of example operations to be performed by the node controller shown in FIG. 1.
Figure 3:
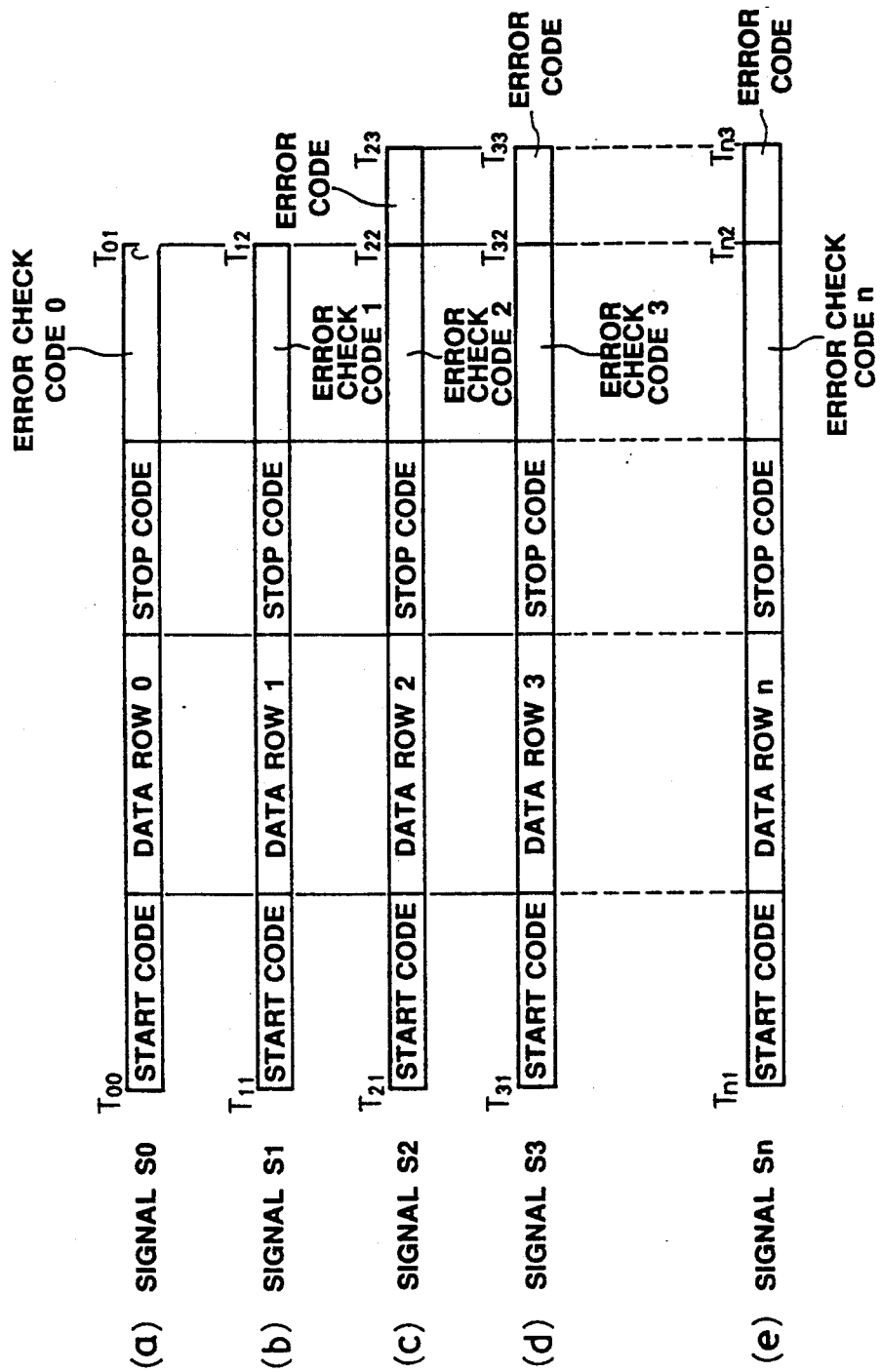
FIG. 3 shows a plurality of schematic views each of which illustrates by way of example a protocol for transmitting signals between the node controllers for the apparatus in accordance with the embodiment of the present invention.

FIGS. 1 to 3 schematically illustrate an apparatus for carrying out serial control in accordance with an embodiment of the present invention, respectively.

Specifically, FIG. 1 illustrates by way of example respective node controllers 41 to 4n on the assumption that the apparatus for carrying out serial control is basically constructed as shown in FIG. 10. It should of course be understood that all the node controllers 41 to 4n are constructed in the same way.

As shown in FIG. 1, each of the node controllers 41 to 4n basically includes an input circuit 401 into which a series of signals (hereinafter referred to as a signal row or data signal row) transmitted from a central main controller 30 or a node controller at the preceding state are inputted and they are then demodulated as required, a start code detecting circuit 402 for detecting from the inputted/demodulated signal row a start code representative of the head end of the data row based on a predetermined logical structure, an error checking circuit 403 for inspecting whether an error occurs between the preceding stage (preceding port) and the present stage (present port) or not, based on an error check code in the inputted/demodulated signal row (the error check code being generated and outputted as a code for searching for presence or absence of an error) via an error checking code generating circuit 407 (to be described later) in the node controller at the preceding state), an error code detecting circuit 404 for monitoring whether or not an error code for informing an occurrence of error (the error code being generated and added via an error code adding circuit 408 to be described later) in response to detection of the occurrence of error is added to the inputted/demodulated signal row and, in a case where the error code has been added thereto, informing this fact, an OR circuit OR for taking a sum of an output derived from detection of an error by the error checking circuit 403 and an output derived from detection of an error code by the error code detecting circuit 404, a data converting circuit 405 for converting data between the inputted/demodulated signal row (exactly speaking, a data row in the inputted/demodulated signal row) and a plurality of sensors or actuators 21 to 2n, the data converting circuit 405 generating and outputting sensor data to be transferred from the present stage based on a sensor output from the corresponding sensor, in a case where the sensors 21 to 2n are employed for the node controllers 41 to 4n, and generating and outputting a driving signal for driving the actuators based on control data to be delivered to the corresponding actuator, in a case where the actuators 21 to 2n are employed for the node controllers 41 to 4n, a stop code detecting circuit 406 for detecting a stop code representative of the tail end of the data row with a predetermined logical structure from the inputted/demodulated signal row having sensor data added thereto or actuator control data removed therefrom via the data converting circuit 405, an error check code generating circuit 407 for newly generating and outputting an error check code based on the inputted/demodulated signal row (output from the data converting circuit), a first switch circuit SW1 for controlling an input of the inputted/demodulated signal row (output from the data converting circuit), an error code adding circuit 408 for generating the error code and adding the error code to the inputted/demodulated signal row (output from the data converting circuit) as required (in response to selection of a second switch circuit SW2 to be described later), a second switch circuit SW2 for selectively outputting any one of the inputted/demodulated signal row (output from the data converting circuit), the signal generated and outputted from the error check code generating circuit 407 (error check code) and the signal outputted from the error code adding circuit 408 (error code) as time elapses, and an output circuit 409 for modulating the signal row selected and outputted from the second switch SW2 as required and delivering the signal row to the node controller at the next stage or the main controller 30.

Here, the input circuit 401 is constructed to include an inpedance matching circuit, an input amplifier, a demodulating circuit or the like component, in a case where transmission of signals from one node controller to another node controller and vice versa is carried out by electrical communication via metallic cables (twice pair cables, coaxial cables or the like cables). Further, the input circuit 401 is constructed to include an photoelectric converter and a demodulating circuit (Manchester demodulating circuit, CMI demodulating circuit or the like circuit), in a case where transmission of signals from one node controller to another node controller and vice versa is carried out by optical communication via optical fibers.

On the other hand, the output circuit 409 is constructed to include a converting circuit and a driver circuit, in a case where transmission of signal from one node controller to another node controller and vice versa is carried out by electrical communication. Further, the output circuit 409 is constructed to include a converting circuit and an electrical-optical converter, in a case where transmission of signals from one node controller to another node controller and vice versa is carried out by optical communication.

The error checking circuit 403 is provided in the form of a well-known circuit adapted to check errors in accordance with a CRC checking process, a vertical/horizontal parity checking process or the like process.

It should be noted that detailed structure of circuits required for allowing the data converting circuit 405 to transmit data from one sensor or actuator to another sensor or actuator of the sensors or actuators 21 to 2n and vice versa and execute adjustment or the like operation in response to transmission of data from one sensor or actuator to another sensor or actuator of the sensors or actuators 21 to 2n and vice versa is not shown in FIG. 1 for the purpose of simplification of illustration.

FIG. 2 shows a plurality of timing charts which illustrate by way of example operations to be performed by the node controller 42 among a plurality of node controllers 41 to 4n. Signal processing operations to be executed at each node controller will be described below in more details with reference to FIG. 2. As will be apparent from FIG. 2, according to the embodiment of the present invention, a method of carrying out signal transmission at each node controller without any time delay is employed for the apparatus. Also in a case of the foregoing method, it is presumed that an error occurs during signal transmission between the node controller 41 and the node controller 42.

Now, it is assumed that signal transmission is carried out from a node controller at the preceding stage (node controller 41) to a node controller at the next stage (node controller 42) in such a manner as shown in FIG. 2(a). The start code detecting circuit 402 detects a start code representative of an input signal row in a timing relationship shown in FIG. 2(b) to control a shifting operation for shifting the first switch circuit SW1 to ON (it should be noted that the first switch circuit SW1 is shifted to OFF at the initial time) (see FIG. 2(g)). Then, the error check generating circuit 407 starts an operation for generating an error check code to be transmitted to a node controller at the next stage (node controller 43) based on the signal row (mainly, data row) which has been inputted thereinto. Incidentally, at this time, the second switch circuit SW2 is held in the initial state as shown in FIG. 2(h), i.e., state wherein inputting via a terminal 1 is selected. Thus, the start code and the data row are added to the output circuit 409 via the second switch circuit SW2 as they are left unchanged, whereby they are outputted and transferred as a signal S2 to the node controller at the next stage (node controller 43) via the output circuit 409 (see FIGS. 2(h) and (i)). In the meantime, the data converting circuit 405 executes an operation for converting data among the corresponding sensors or actuators.

Next, the thus transmitted signal row is detected by the stop code in a timing relationship shown in FIG. 2(c).

When the stop code detecting circuit 406 detects the stop code in that way, it carries out control such that the first switch circuit SW1 is turned off to assume the initial state and the second switch circuit SW2 is shifted to assume a state wherein inputting via a terminal 2 is selected (see FIGS. 2(c), (g) and (h)).

In response to the shifting operation of the second switch circuit SW2, the error check code 2 which has been newly generated in the error check code generating circuit 407 is selected and outputted from the second switch circuit SW2 subsequent to the stop code which has been already detected so that it is transferred further via the output circuit 409 (see FIG. 2(i)).

At the same time as the aforementioned operations, the error check circuit 403 executes an inspecting operation with respect to the error check code (error check code 1) which has been transferred from the node controller at the preceding stage (node controller 41). As a result, if no data error occurs, no signal is outputted from the error check circuit 403. As is presumed here, in a case where an occurrence of error is confirmed by the error check code 1, an error detecting signal having a logical "1" level is outputted from the error checking circuit 403 for a short period of time at the same time when the occurrence of error has been confirmed (see FIG. 2(d)). Therefore, an output from the OR circuit OR has a logical "1" level for the foregoing period of time (for a period of time when the error detecting signal has been outputted). An output from the OR circuit OR is added to the second switch circuit SW2 from the error check code generating circuit 407 together with an error check code outputting completion signal which has been transmitted on completion of outputting of the error check code generated by the error check code generating circuit 407 (see FIGS. 2(i) and (e)).

The second switch circuit SW2 is provided in the form of a switch circuit of which shifting operation is controlled in dependence on the present logical level representative of a signal to be transmitted from the OR circuit OR, under a condition that a signal representative of completion of outputting of generated error check code is transmitted from the error check code generating circuit 407, in such a manner that, if a logical level representative of a signal to be transmitted from the OR circuit OR remains at a logical "0" level, the present operative state is shifted to the initial state, i.e., a state wherein inputting via the terminal 1 is selected and, if the logical level remains at a logical "1" level, the present operative state is shifted to assume a state wherein inputting via a terminal 3 is selected. Therefore, in this case, the second switch circuit SW2 is shifted to assume a state wherein inputting via the terminal 3 is selected at the same time when an error check code outputting completion signal is outputted, whereby an error code to be outputted from the error code adding circuit 408 is added to a signal to be transferred and outputted via the output circuit 409 subsequent to the error check code (error check code 2) which has been generated and outputted from the error check code generating circuit 407 (see FIGS. 2(h) and (i)).

Thereafter, on completion of addition of the error code in the error code adding circuit 408, an error code adding completion signal is transmitted to the second switch circuit SW2 (see FIGS. 2(i) and (f)), whereby the second switch circuit SW2 is shifted to assume the initial state, i.e., a state wherein inputting via the terminal 1 is selected (see FIG. 2(h)).

As the node controller 42 operates in the above-described manner, an error code for informing that an error has occurred is favorably added to the signal S2 to be transferred and outputted from the node controller 42 to the node controller 43 at the next stage. With respect to node controllers located downstream of the node controller 43, the error code which has been added in that way via the error code detecting circuit 404 is detected such that an output from the OR circuit OR at the time of outputting of the error check code outputting completion signal is set to the logical "1" level based on the aforementioned detection. This causes a signal having the error code added thereto to be transferred and outputted from all the node controllers located downstream of the node controller 43.

FIG. 3 typically shows a plurality of signal transmission protocols based on the above-described presumption with respect to a series of signals S0, S1, S2, S3, --- Sn to be transmitted between the respective node controllers (see FIG. 10) (representing that an error has occurred between the node controller 41 and the node controller 42). As is apparent from the protocols in FIG. 3, the respective signals S1, S2, S3, --- Sn are transmitted from the nodes 41, 42, 43, --- 4n with configurations shown in FIGS. 3(b), (c), (d) and (e) in response to transmission of the signal S0 having a configuration shown in FIG. 3(a) from the main controller 30, by repeatedly executing the aforementioned operations in the respective node controllers 41 to 4n.

It should be added that only the signal Sn outputted from the last node controller 4n is taken in the main controller 30. A machine controller 10 (see FIG. 10) confirms an occurrence of error in the apparatus based on the error code which has been added to the signal Sn which has been taken in the main controller 30.

In such manner, according to the embodiment of the present invention, even in a case where a series of signals S0 to Sn are transmitted without time delay between adjacent node controllers, i.e., even in a case where times $T_{00}$ to $T_{n3}$ additionally noted to the respective protocols shown in FIG. 3 are determined in accordance with the following relationship among the times $T_{00}$ to $T_{n3}$, $$T_{00} = T_{11} = T_{21} = T_{31} = T_{n1}$$

the apparatus can effectively inform an occurrence of error of all the node controllers inclusive of the main controller 30. Generally, in a case where at least the following relationship of inequalities is maintained with respect to the aforementioned times $T_{00}$ to $T_{n3}$, the above-described method of informing an occurrence of error in accordance with the embodiment of the present invention is effectively employable for the apparatus.

$$T_{11} < T_{01}, T_{21} < T_{12}, T_{31} < T_{22} \cdots$$

According to the embodiment of the present invention, the main controller 30 (machine controller 10) can be informed of an occurrence of error in the apparatus based on the error code added to the signal Sn which has been outputted from the node controller 4n having a port NO. n (at stage NO. n) but can not be informed as to at what part or location the error has occurred.

Figure 4:
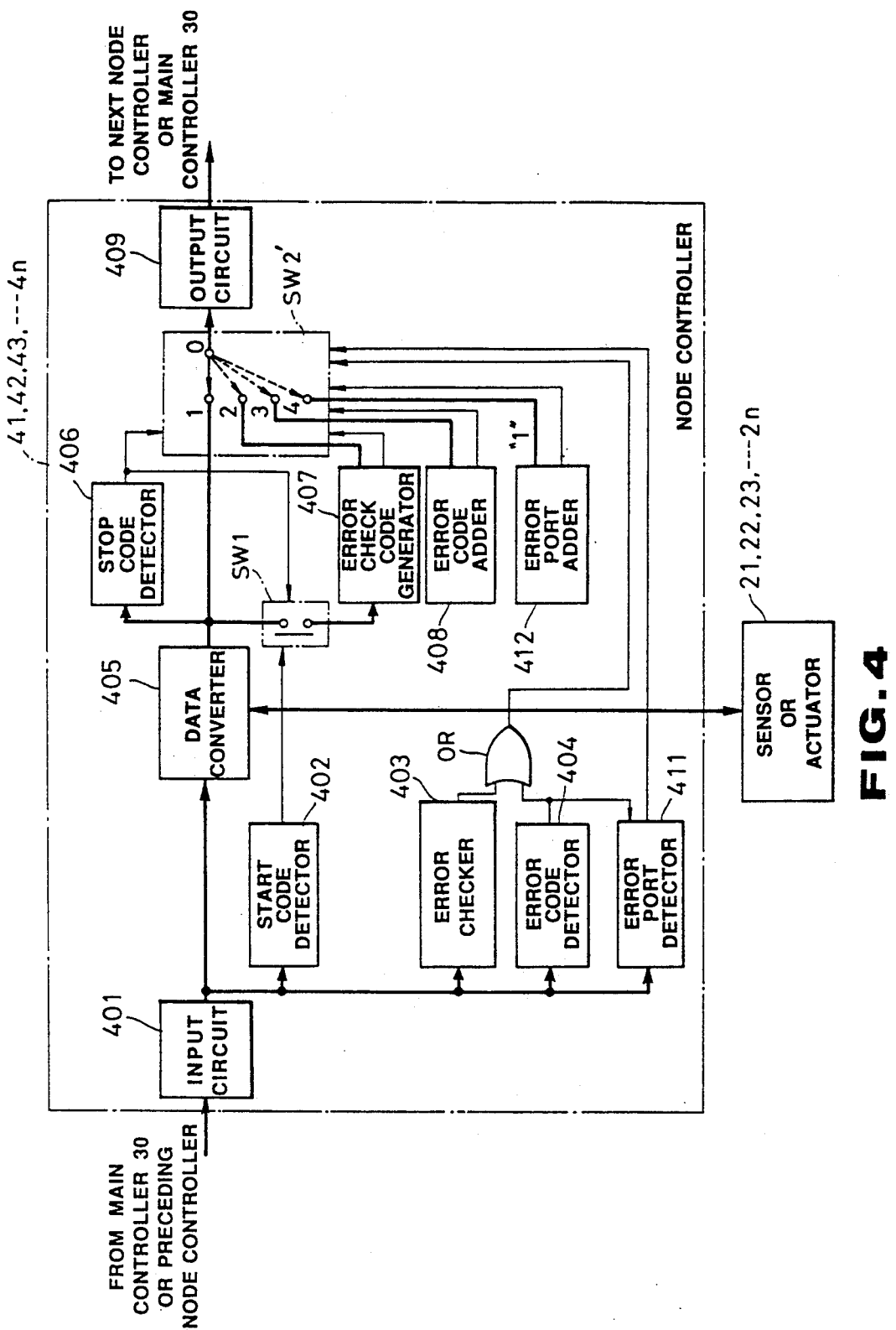
FIG. 4 is a block diagram which schematically illustrates by way of example each node controller for an apparatus for carrying out serial control in accordance with other embodiment of the present invention.
Figure 5:
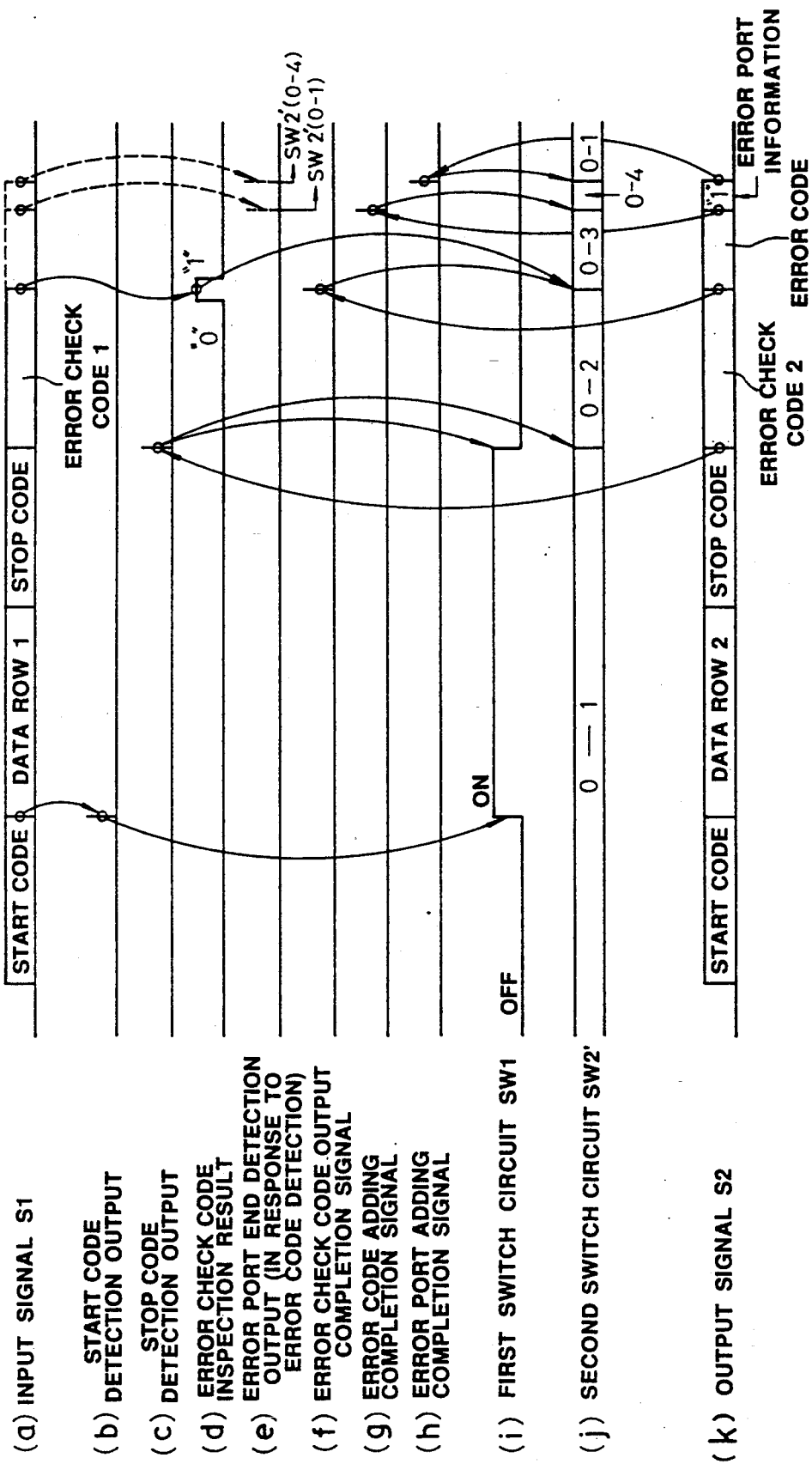
FIG. 5 shows a plurality of timing charts each of which illustrates by way of example operations to be performed by the node controller in FIG. 1.
Figure 6:
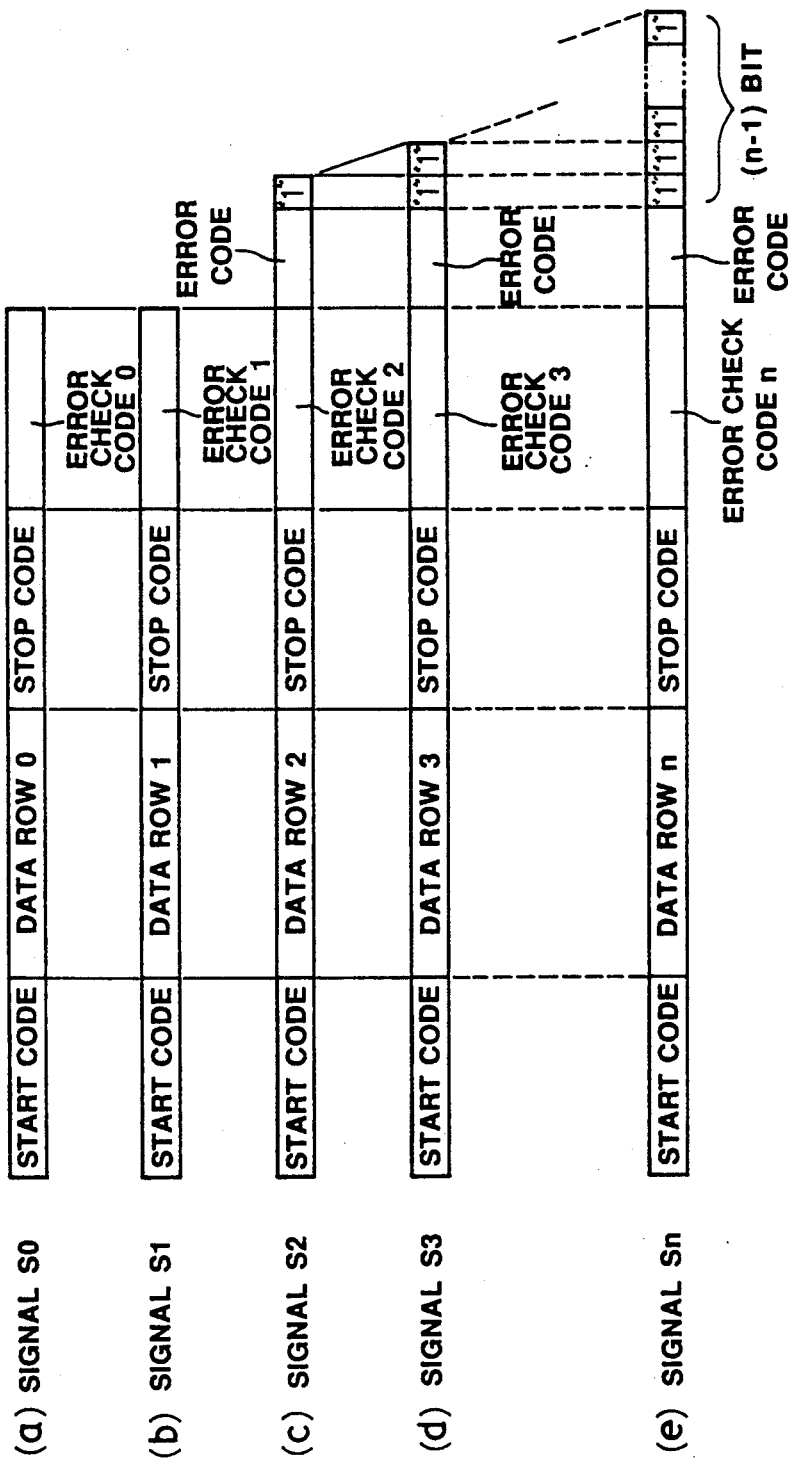
FIG. 6 shows a plurality of schematic views each of which illustrates by way of example a protocol for transmitting signals between the node controllers shown in FIGS. 4 and 5.

FIGS. 4 to 6 show an apparatus for carrying out serial control in accordance with other embodiment of the present invention wherein the apparatus makes it possible with the foregoing problem in the first embodiment in mind to allow the main controller 30 to be effectively informed of the location where an error has occurred.

Specifically, in this embodiment, FIG. 4 illustrates by way of example concrete structure of the respective node controllers 41 to 4n on the assumption that the apparatus is basically constructed as shown in FIG. 10 in the same manner as in the embodiment in FIG. 1, FIG. 5 illustrates by way of example operations to be performed by the node controller shown in FIG. 4, and FIG. 6 illustrates by way of example a plurality of protocols particularly employable for respective transmitted signals in this embodiment. Also in this embodiment, a method of transmitting signals in connection with illustration in FIG. 5 and FIG. 6 as well as a presumption on an occurrence of error are described as one example below in the same manner as in the first embodiment based on the assumption of a method of transmitting signals without time delay between the respective node controllers as well as an occurrence of error during signal transmission between the node controller 41 and the node controller 42. Referring to FIG. 4 again, the same circuits as those in FIG. 1 are identified by same reference numerals. Thus, repeated description will not be required.

According to this embodiment, as shown in FIG. 4, each of the node controllers 41 to 4n is provided with a four input selection type switch circuit SW2' as a second switch circuit. Further, it includes an error port end detecting circuit 411 and an error port adding circuit 412.

The error port adding circuit 412 is provided in the form of a circuit adapted to add a signal having a logical "1" level by a quantity of, e.g., one bit via an input terminal 4 of the second switch circuit SW2' subsequent to the error code as an error port information for allowing the main controller 30 (machine controller 10) to identify the port (node controller 42 in this embodiment) where an occurrence of error has been confirmed. After completion of an operation for adding an error port information, the error port adding circuit 412 operates to transmit an error port adding completion signal to the second switch circuit SW2'.

The error port end detecting circuit 411 is provided in the form of a circuit adapted to be activated in response to an output derived from detection of an error code by the error code detecting circuit 404 to detect the error port information to be added subsequent to the error code as well as a location where the error port information is interrupted, i.e., an error port information end, in a case where a signal row inputted into its own port (exactly speaking, signal row inputted and demodulated by the input circuit 401) includes an error code. In response to detection of the error port end information, the error port end detecting circuit 411 operates to output to the second switch circuit SW2' a detection signal which represents that the error port end information has been detected.

A selecting (shifting) operation of the second switch circuit SW2' is logically preset in the following manner. In detail, while the second switch circuit SW2' is held in its initial state, as shown in FIG. 5(j), it assumes a state wherein inputting via a terminal 1 is selected (it should be noted that an inputted/demodulated signal row is outputted via the output circuit 409 as it is left unchanged, while the foregoing state is maintained). When the second switch circuit SW2' receives an output derived from detection of a stop code (see FIG. 5(c)), it assumes a state wherein inputting via a terminal 2 is selected (it should be noted that the error check code which has been newly generated and outputted via the error check code generating circuit 407 is outputted via the output circuit 409, while the foregoing state is maintained). When an output from the OR circuit OR is held at a logical "0" level based on the present logical level representative of an output from the OR circuit OR at the time when the second switch circuit SW2' receives an error check outputting completion signal (i.e., at the time when no error occurs) (see FIG. 5(f)), it assumes the initial state, i.e., a state wherein inputting via the terminal 1 is selected. Similarly, when an output from the OR circuit OR is held at a logical "1" level (i.e., when an occurrence of error is confirmed or when an error has heretofore occurred), the second switch circuit SW2' assumes a state wherein inputting via a terminal 3 is selected (it should be noted that the error code outputted from the error code adding circuit 408 is outputted via the output circuit 409). When an output derived from detection of the error code detecting circuit 404 (output derived from the OR circuit OR) is held at a logical "0" level based on the logical level representative of the output from the error code detecting circuit 404 at the time when the second switch circuit SW2' receives an error code adding completion signal (see FIG. 5(g)), it assumes a state wherein inputting via a terminal 4 is selected (it should be noted that an error port information "1" outputted from the error port adding circuit 412 is delivered via the output circuit 409, while the foregoing state is maintained). Similarly, when an output from the OR circuit OR is held at a logical "1" level, the second switch circuit SW2' once assumes the initial state, i.e., a state wherein inputting via the terminal 1 is selected (at this time, it should be noted that the error port information added to the signal row till the node controller at the preceding stage is delivered via the output circuit 409). Then, the second switch circuit SW2' assumes a state wherein inputting via the terminal 4 is selected, only when it receives a detection signal from the error port end detecting circuit 411. In addition, when the second switch circuit SW2' receives an error port adding completion signal from the error port adding circuit 412 (see FIGS. 5(k) and (h)), it is restored to the initial state, i.e, a state wherein inputting via the terminal 1 is selected.

Therefore, in a case where an error occurs between the node controller 41 and the node controller 42 and the occurrence of error is confirmed by the node controller 42 in the same manner as in the above-described embodiment, the second switch circuit SW2' and associated circuits operate in response to inputting of a signal S1 having no error code added thereto, as represented by a plurality of timing charts in FIG. 5 (see FIG. 5(a)), whereby an error code information and an error port information are added to the node controller 42 in such a manner as shown in FIG. 5(k) and they are then outputted to the node controller 43 at the next stage as a signal S2, respectively. This causes the node controller 43 to detect the error code information end and the error port information end which have been added thereto in such a manner as represented by dotted lines in FIGS. 5(a) and (b), whereby a signal S3 to be transmitted to a node controller 44 at the next stage is outputted further based on the selecting operation of the second switch SW2' in such a manner as shown in FIG. 6(d). With respect to node controllers located downstream of the node controller 44, same processings are repeatedly executed. Consequently, a plurality of protocols for a series of signals S0 to Sn to be transmitted between the respective node controllers are determined in such a manner as typically shown in FIG. 6.

According to the embodiment of the present invention, what is taken in the main controller 30 is only the signal Sn which has been outputted from the node controller 4n at the final stage, like in the preceding embodiment. In a case of this embodiment, however, the main controller 30 (machine controller 10) can recognize a location (port) where an error has occurred, based on the error code information and the error port information having (n−1) bits added to the signal Sn (see FIG. 6(e)), at the same time when an error has occurred in the apparatus. Thus, with the apparatus of the present invention having the number n of ports (corresponding to the node controllers 41 to 4n) in addition to the main controller 30, in a case where the port NO. k (the second port in the preceding embodiment) confirms a first occurrence of error, the machine controller 10 can know an address k of the port NO. k which has confirmed the occurrence of error, based on the error port information having (n−k+1) bits.

In this manner, according to the embodiment of the present invention shown in FIGS. 4 to 6, the apparatus can effectively inform all the node controllers including the main controller 30 of an occurrence of error, even in a case where a series of signals S0 to Sn are transmitted between the respective node controllers without time delay in the same manner as in the preceding embodiment. At the same time, the apparatus can inform the main controller 30 (machine controller 10) of a location where an error has occurred.

Figure 7:
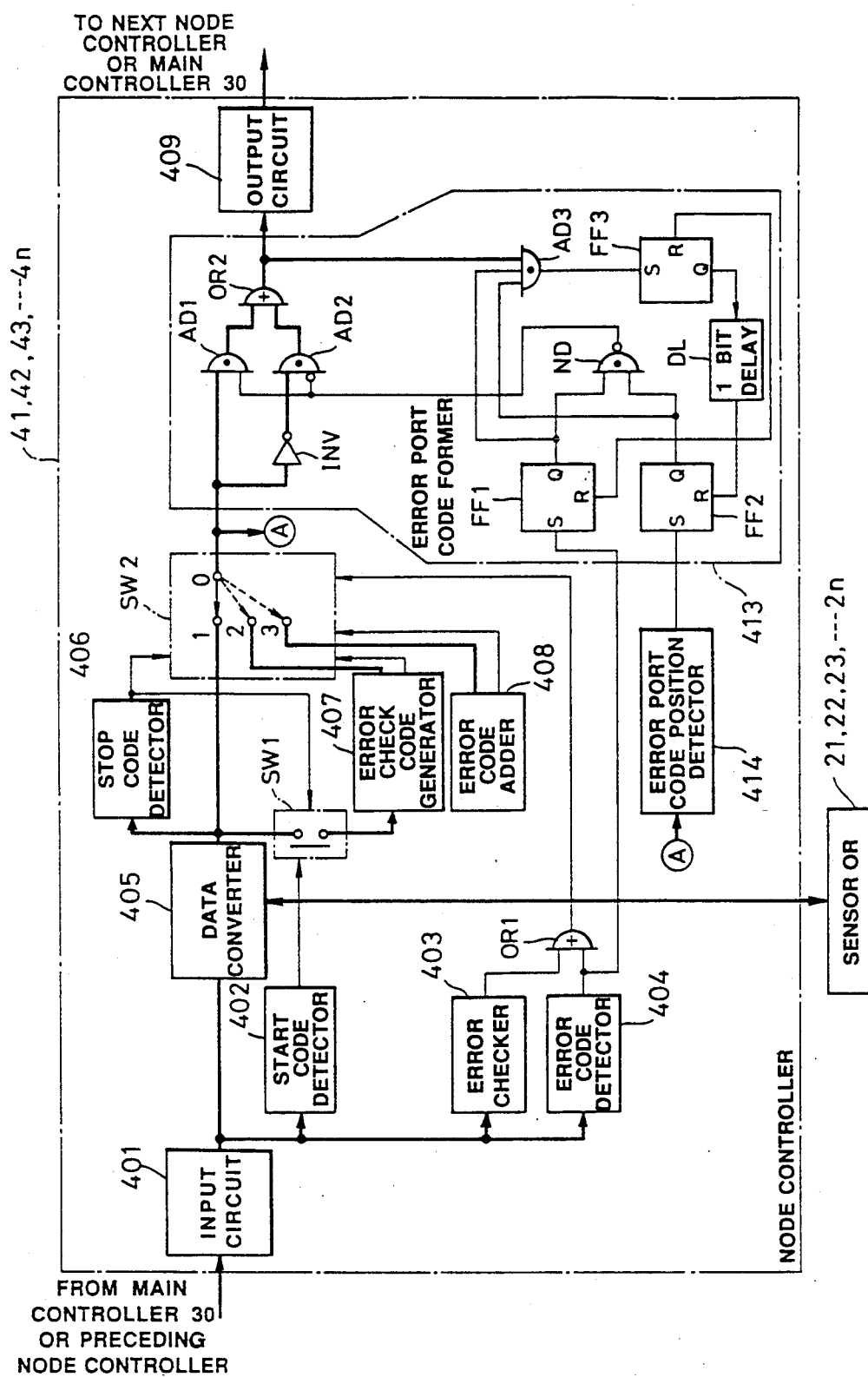
FIG. 7 is a block diagram which schematically illustrates by way of example each node controller for an apparatus for carrying out serial control in accordance with another embodiment of the present invention.
Figure 8:
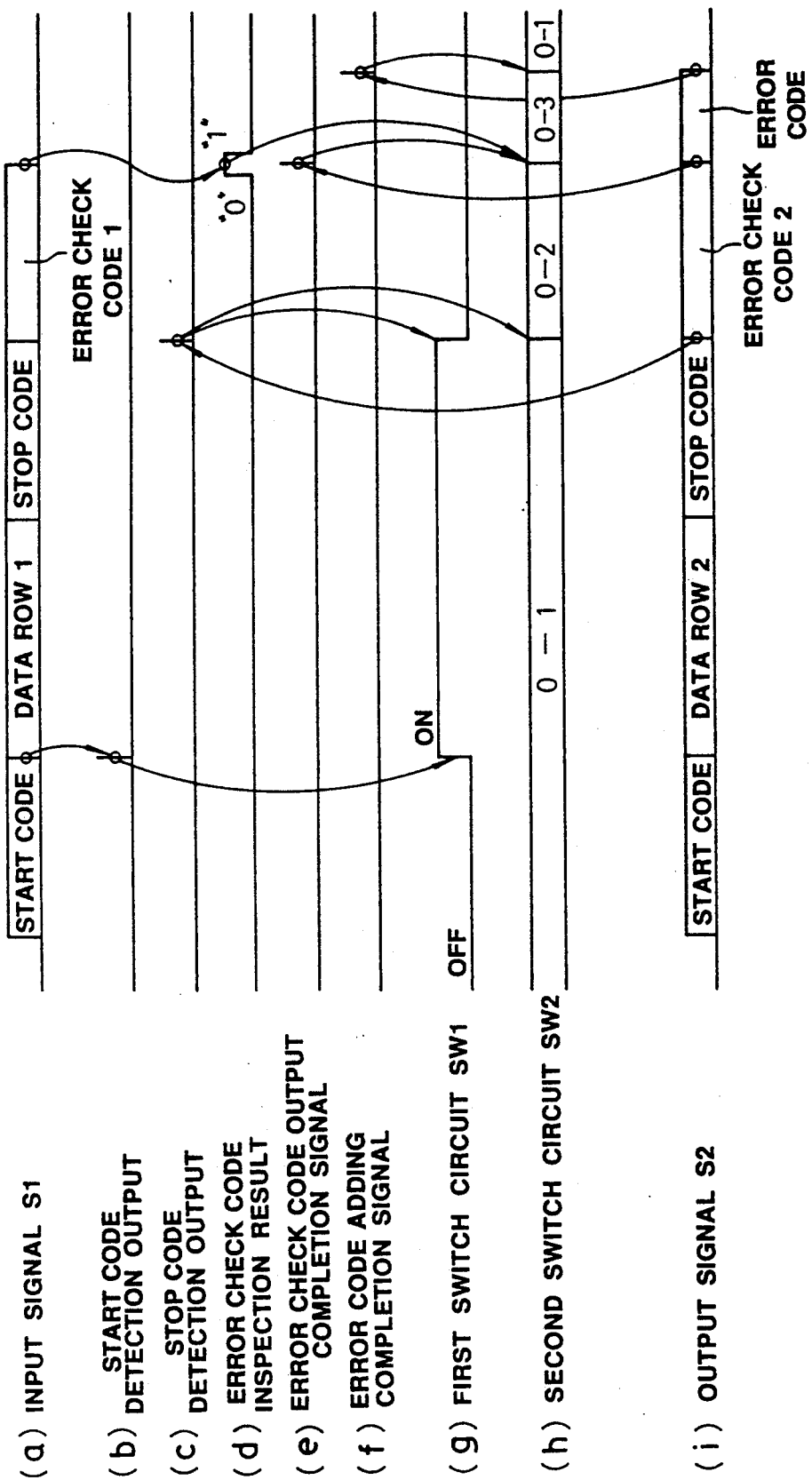
FIGS. 8 and 9 show a plurality of timing charts each of which illustrates by way of example operations to be performed by the node controller in FIG. 7, respectively.
Figure 9:
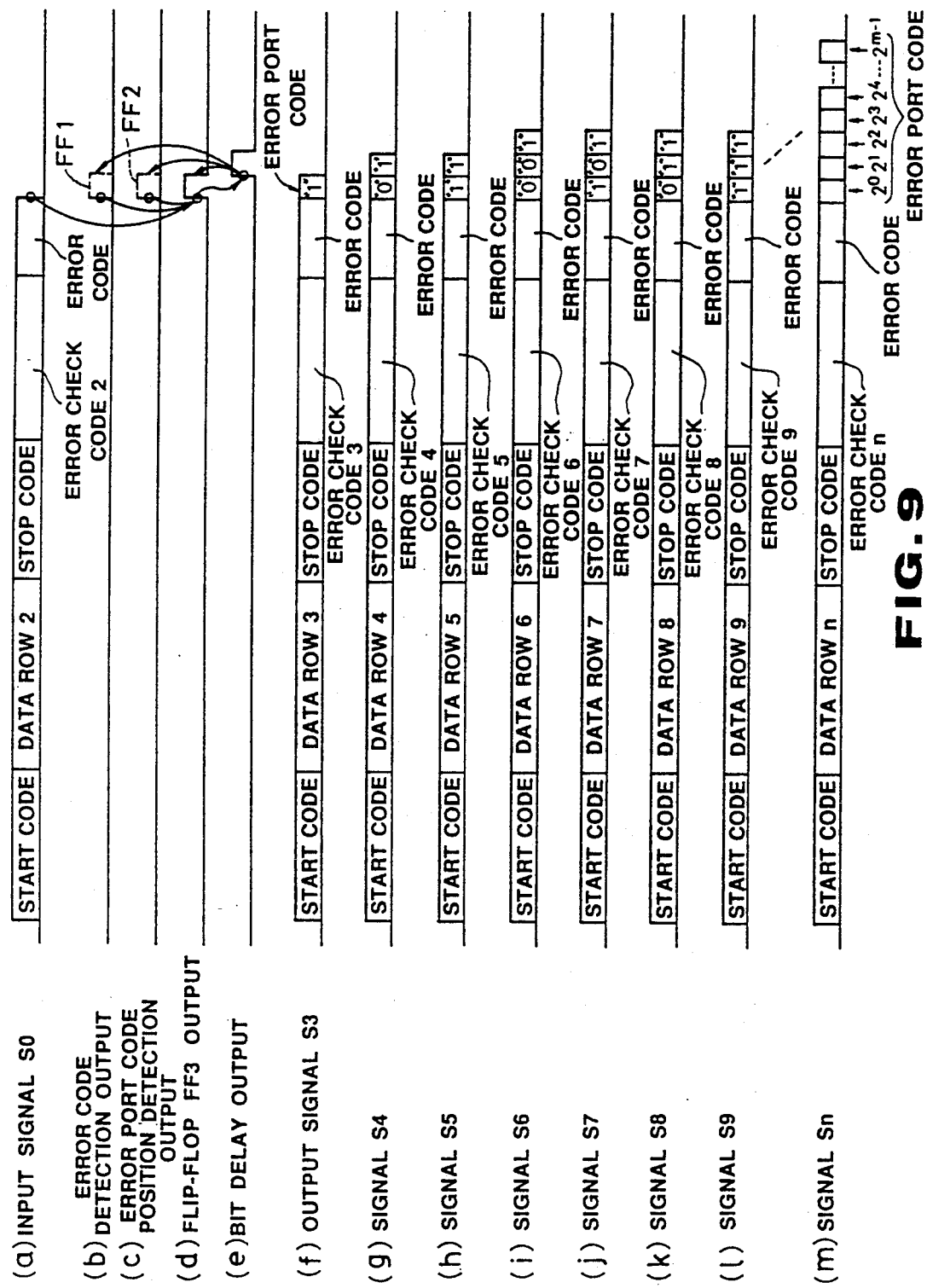

FIGS. 7 to 9 schematically illustrate an apparatus for carrying out serial control in accordance with another embodiment of the present invention, respectively, wherein a function of informing a location where an error occurs as described above with respect to the embodiment shown in FIGS. 4 to 6 has been improved further. According to this embodiment, the function of informing a location where an error occurs can be realized at a high efficiency by reducing the number of bits representative of error port informations.

In this embodiment, FIG. 7 illustrate by way of example concrete structure of the respective node controllers 41 to 4n on the assumption that the apparatus is basically constructed as shown in FIG. 10 in the same manner as in FIG. 1 or FIG. 4, and FIGS. 8 and 9 illustrate by way of example operations to be performed by the node controllers 41 to 4n shown in FIG. 7, respectively. Also in this embodiment, assumption on a method of transmitting signals in connection with illustration in FIG. 8 and FIG. 9 as well as an occurrence of error is made in the same manner as in the aforementioned embodiments based on the presumption of, e.g., a method of transmitting signals without time delay in each node controller as well as an occurrence of error during transmission of signals between the node controller 41 and the node controller 42. Referring to FIG. 7 again, the same circuits as those in FIG. 1 are identified by same reference numerals. Thus, repeated description on these circuits will not be required.

As shown in FIG. 7, according to the embodiment of the present invention, each of the node controllers 41 to 4n includes an error port cord forming circuit 413 for additionally forming an error port code at the tail end of a signal to be transmitted to the output circuit 409 with structure as shown in FIG. 7 to indicate a location where an error occurs in a case where an error code is detected from the inputted/demodulated signal and an error port code position detecting circuit 414 for detecting a position where an error port code to the signal to be transmitted (addition timing), i.e., a position assumed by the tail end of an error code of the signal to be transmitted (signal to be outputted from the second switch circuit SW2) in addition to the respective circuits shown in FIG. 1.

With the error port code position detecting circuit 414, detection of the position where the error port code is added (position assumed by the tail end of the error code) is carried out, e.g., in such a manner that a stop code of the signal to be transmitted (signal outputted from the second switch circuit SW2) is once detected and a position where the error port code is added is then determined after a predetermined bit time (period) elapses. Thus, with the apparatus of the present invention, when it is assumed that the number of bits of the error code is set to, e.g., 8 bits and the number of bits of the error check code is set to, e.g., 16 bits, the position (timing) assumed when a period of time elapses by 24 bits (16 bits +8 bits) after detection of the stop code represents a position (addition timing) where the error port code which has been detected is to be added. Further, the error port code position detecting circuit 414 outputs an one shot-shaped pulse signal in synchronization with detection (determination) of the error port code adding position. Such a manner of outputting detection as described above is same with other detecting circuits 402, 404 and 408.

FIG. 8 shows a plurality of timing charts which illustrate by way of example operations to be performed by one of the node controllers 41 to 4n, e.g., a node controller 42. In fact, operations to be performed by the node controller 42 partially overlap operations to be performed by the apparatus in accordance with the embodiment shown in FIGS. 1 to 3 depending on the state of the signal row to be transmitted. In view of the foregoing fact, signal processing operations to be executed by each node controller will be described below in more details with reference to FIG. 8.

Now, it is assumed that a signal as shown in FIG. 8(a) is transmitted from a node controller at the preceding stage (node controller 41) to a node controller at the next stage (node controller 42) and it is then inputted and demodulated in the input circuit 401. The start code detecting circuit 402 detects a start code in the input signal row in a timing relationship shown in FIG. 8(b) to control a shifting operation for turning on the first switch circuit SW1 (which has been turned off at the initial time)(see FIG. 8(g)). This allows the error check code generating circuit 407 to start an operation for generating an error check code to be transmitted to a node controller at the next stage (node controller 43) based on the signal row which has been inputted into the error check code generating circuit 407 (mainly, data row). Incidentally, at this time, the second switch circuit SW2 is held in the initial state, i.e., a state wherein inputting via a terminal 1 is selected, as shown in FIG. 8(h), whereby the start code and the data row are added to the output circuit 409 via the second switch circuit SW2 as they are left unchanged and they are then transferred and outputted to the node controller at the next stage (node controller 43) via the output circuit 409 (see FIGS. 8(h) and (i)). In the meantime, the data converting circuit 405 executes a data converting operation between the corresponding sensors or actuators (22).

As the signal row is transmitted in that way, the stop code detecting circuit 406 detects a stop code in a timing relationship as shown in FIG. 8(c).

When the stop code detecting circuit 406 detects the stop code in that way, it controls a shifting operation for shifting the first switch circuit SW1 to the initial state, i.e., an OFF state and shifting the second switch circuit SW2 to a state wherein inputting via a terminal 2 is selected (see FIGS. 8(c), (g) and (h)).

In response to shifting of the second switch circuit SW2 in that way, the error check code 2 which has been newly generated in the error check code generating circuit 407 is selected from the second switch circuit SW2 subsequent to the stop code which has been already selected and it is then transferred via the output circuit 409 (see FIG. 8(i)).

At the same time, the error checking circuit 403 executes an inspecting operation with respect to the error check code (error check code 1) which has been transferred from the node controller at the preceding stage (node controller 41). If no data error occurs, no signal is outputted from the error checking circuit 403 but, in a case where an occurrence of error is confirmed by the error checking code as is presumed here, an error detecting signal held at a logical "1" level is outputted from the error checking circuit 403 for a short period of time at the same time as confirmation of the occurrence of error (see FIG. 8(d)). Therefore, an output from an OR circuit OR1 is also held at a logical "1" level for the foregoing period of time (for a period of time when an error detecting signal is outputted). The output from the OR circuit OR1 is added to the second switch circuit SW2 together with an error check code outputting completion signal which has been generated on completion of outputting of the error check code generated by the error check code generating circuit 407 (see FIGS. 8(i) and (e)).

The second switch circuit SW2 is provided in the form of a switch circuit adapted to control a shifting operation depending on the logical level of a signal to be added from the OR circuit OR to assume the initial state, i.e., a state wherein inputting via the terminal 1 is selected when the foregoing logical level is held at a logical "0" level or assume a state wherein inputting via a terminal 3 is selected when the foregoing logical state is held at a logical "1" level, under a condition that an outputting completion signal representative of the error check code is added from the error check code generating circuit 407, as described above. Therefore, in this case, at the same time when an error check code outputting completion signal is generated, the second switch circuit SW2 assumes a state wherein inputting via the terminal 3 is selected, whereby an error code to be outputted from the error code adding circuit 408 is added to the signal which has been transferred and outputted via the output circuit 409, subsequent to the error check code (error check code 2) which has been generated and outputted from the error check code generating circuit 407 (see FIGS. 8(h) and (i)).

Thereafter, on completion of adding of the error code, the error code adding circuit 408 transmits an error code adding completion signal to the second switch circuit SW2 (see FIGS. 8(i) and (f)) so that the second switch circuit SW2 is brought in the initial state. i.e., a state wherein inputting via the terminal 1 is selected (see FIG. 8(h)).

As a result derived from the aforementioned operations of the node controller 42, an error code for informing that the node controller 42 is held in a state wherein an error has occurred is favorably added to the signal S2 to be transferred and outputted from the node controller 42 to the node controller 43 at the next stage. In the meantime, any error code is not detected from the inputted/demodulated signal derived from the input circuit 401 in the node controller 42. Therefore, a NAND condition for an NAND circuit ND is not established also in the error port code forming circuit 413 (in this case, it should be noted that a Flip-Flop FF2 is set but a Flip-Flop FF1 is not set), whereby a signal outputted from the second switch circuit SW2 is added to the output circuit 409 as it is left unchanged, via an AND circuit (AND gate) AD1 and an OR circuit (OR gate) OR2.

Next, operations of the apparatus in accordance with the embodiment of the present invention will be described below with reference to FIG. 9 as to the node controller 43 inclusive of other node controllers located downstream of the node controller 43.

First, the node controller 43 carries out detection of a start code in response to the signal S2 inputted via the input circuit 401 and then demodulated (see FIG. 9(a)), inputting/outputting of corresponding data, detection of a start code, inspection of error check code 2 (error check) and generation and addition of a new error check code 3 in the same manner as operation with the node controller 42. Thereafter, the node controller 403 detects an error code to be added via the error code detecting circuit 404 (see FIG. 9(b)). The node controller 403 holds an output from the OR circuit OR1 at a logical "1" level based on detection of the error code in the same manner as described above, when an error check code outputting completion signal (see FIG. 8(c)) is transmitted from the node controller at the present stage. This causes a signal having an error code added thereto to be outputted from the node controller 43 in response to the same operation of the switch circuit SW2 as described above.

In addition, the node controller 43 allows the Flip-Flop FF1 in the error port code forming circuit 413 to be set in response to detection of the error code (see FIG. 9(b)). Further, the node controller 43 allows the Flip-Flop FF2 in the error port code forming circuit 413 to be set at the time when the error port code position detecting circuit 414 detects an error port code position (error code end position) (see FIG. 9(c)). This enables the NAND condition of the NAND circuit ND in the error port code forming circuit 413 to be settled satisfactorily, whereby the AND circuit (AND gate) AD1 is closed and the AND circuit (AND gate) AD2 is opened at the same time when the NAND conditions is settled. Thus, a signal outputted from the second switch circuit SW2 in the node controller 43 is added to the output circuit 409 via the AND circuit AD2 and the OR circuit OR2 in the form of a signal logically inverted by an inverter INV, at the time when the NAND condition has been settled (at the time when the error code position has been detected). In this case, it should be added that the signal level just behind the error code added in that way is held at a logical "1" level in response to receiving of a signal to be added to the output circuit 409 and then transferred and outputted to a node controller at the next stage (node controller 44) via the output circuit 409 (see FIG. 9(f)).

When a signal outputted from the OR circuit OR2 is held at a logical "1" level in the above-described manner, an AND condition of an AND circuit AD3 is established in response to outputting of the preset Flip-Flops FF1 and FF2 (held at a logical "1" level), whereby a Flip-Flop FF3 serving as a third Flip-Flop is brought in a set state (see FIG. 9(d)). A set output from a Flip-Flop FF3 is delayed by an one-bit delay circuit DL for a period of time represented by one bit time and added to respective reset terminals R of the Flip-Flop FF1, the Flip-Flop FF2 and the Flip-Flop FF3, causing the Flip-Flop FF1, the Flip-Flop FF2 and the Flip-Flop FF3 to be reset (see FIGS. 9(e), (b), (c) and (d)). Specifically, in a case where a part of the signal outputted from the OR circuit OR2 and located behind the position of the error port is brought in a logical "1" level and thereby the AND condition of the AND circuit AD3 is settled, the NAND condition of the NAND circuit ND fails to be settled after the signal held at the logical "1" level is maintained for a period of time represented by one bit so that the signal to be outputted from the second switch circuit SW2 is added again to the output circuit 409 via the AND circuit AD1 and the OR circuit OR2 from the aforementioned time point.

With respect to the signal S2 inputted in the node controller 43 in such a manner as shown in FIG. 9(a) under the function of the second switch circuit SW2 and the error port code forming circuit 413, an error code is subsequently added to the error check code 3 which has been newly generated in response to the signal S2 in the same manner as described above. Thereafter, an error port code "1" is added to the error check code 3 in such a manner as shown in FIG. 9(f), and the signal having the error code and the error port code "1" added thereto is transferred to the node controller 44 at the next stage as an output signal S3 from the node controller 43.

In this manner, the second switch circuit SW2 at each node controller executes the following operations.

A) In a case where any error or any error code is not detected from an input signal to be inputted into the relevant node controller, the second switch circuit SW2 outputs to the output circuit 409 a set of serial signals to be transmitted, each signal including a start code, a data row, a stop code and an error check code generated by the error check code forming circuit 407 in the node controller at the present stage.

B) In a case where an error or an error code is detected from the input signal, the second switch circuit SW2 adds the error code to the tail end of a signal row and outputs to the output circuit 409 a set of serial signals to be transmitted, each signal including a plurality of codes ranging from the start code till the error code.

Next, the error port code forming circuit 413 executes the following operations.

a) In a case where no error code is detected from an input signal to be inputted into a relevant node controller, the error port code forming circuit 413 transmits an output signal from the second switch circuit SW2 to the output circuit 409 as it is left unchanged, while the AND circuit (AND gate) AD1 side is kept opened (the AND circuit AD2 side is kept closed).

b) In a case where an error code is detected from the input signal, the error port code forming circuit 413 once opens the AND circuit (AND gate) AD2 side (the AND circuit AD1 side is closed), at the time when an error port code position (error code tail end position) is detected together. Then, a part of the output signal from the second switch circuit SW2 located behind the error port code position is logically inverted by the inverter INV and then transmitted to the output circuit 409.

c) When a logical level for signals to be transmitted in a logically inverted state reaches a logical level "1", the error port code forming circuit 413 opens the AND circuit AD1 side again. Then, a part of the output signal from the second switch circuit SW2 located behind the second switch circuit SW2 is outputted to the output circuit as it is left unchanged.

Consequently, according to the embodiment of the present invention, an error code and an error port code are successively added also to a series of signals S4 to Sn outputted from node controllers located downstream of the node controller 44 in such a manner as shown in FIGS. 9(g) to (m).

Here, it will be significant that attention is paid to signals which are formed and added behind the error code as an error port code.

As will be apparent from FIG. 9(a) and FIGS. (f) to (l) which illustrate operations to be performed by the error port code forming circuit 413, the signal constituting the error port code is provided in the form of a signal including a logical structure of the type which is successively subjected to binary addition by a quantity of "1" at every time when it passes through a node controller at the next stage from the port (node controller 42) which has confirmed an occurrence of error.

With such structure, e.g., the error port code "1" of a signal S3 shown in FIG. 9(f) is represented by the following equation using decimal numerals.

$$1 \times 2^0 = 1$$

Similarly, the error port code "01" of a signal S4 shown in FIG. 9(g) is represented by the following equation.

$$0 \times 2^0 + 1 \times 2^1 = 2$$

Further, similarly, the error port code "111" of a signal S9 shown in FIG. 9(l) is represented by the following equation.

$$1 \times 2^0 + 1 \times 2^1 + 1 \times 2^2 = 7$$

Therefore, when it is assumed that the number n of node controllers is 9, i.e., n=9 and the signal S9 shown in FIG. 9(l) is taken in the main controller 30, the main controller 30 can recognize that the port represented by the following equation derived from reverse calculation, i.e., the node controller 42 is "a port which has confirmed an occurrence of error".

$$7 + 1 = 8$$

It should of course be understood that the above result coincides with the preset assumption (an error occurs during transmission of signals between the node controller 41 and the node controller 42, i.e., an occurrence of error is confirmed at the node controller 42). In a case of the foregoing embodiment, a code length of the error port code is represented by the following term with respect to the number n of node controllers, i.e., the number n of ports.

$$\log_2 n \text{ (bits)}$$

For example, in a case where the number of ports is 100, i.e., n=100, the code length is represented by 7 bits ($\log_2 100/6.6$).

In this manner, according to the embodiment of the present invention, even in a case where a series of signals S0 to Sn are transmitted between the respective node controllers without time delay, the apparatus can effectively inform all the node controller including the main controller 30 of an occurrence of error. Particularly, the apparatus can inform the main controller 30 (machine controller 10) also of a location where an error occurs, at a high efficiency at the same time as the aforementioned information.

Further, according to the above-described embodiment, the error port code forming circuit 413 and associated components are constructed as shown in FIG. 7. However, the present invention should not be limited only to this. Alternatively, another structure modified in the following manner may be employed for the error port code forming circuit 413 and associated components shown in FIG. 7.

A logical sum of an error code adding completion signal outputted from the error code adding circuit 408 (see FIG. 8(f) and an error code detecting output outputted is added to a set terminal S of the Flip-Flop FF1.

In this case, the port (node controller) which has confirmed an occurrence of error starts formation and addition of an error port code. Therefore, in a case of the aforementioned example, the output signal S2 from the node controller 42 becomes a signal including an error port code "1" as shown in FIG. 9(f) and the output signal S3 from the node controller 43 becomes a signal including an error port code "01". Similarly, later output signals following the output signal S3 become such a signal that the content of binary addition of an error port code to be added to the signal shifts successively. Thus, in this case, the main controller 30 recognizes that the port located upstream of the port NO. n by a value represented by way of reverse calculation by a decimal numeral representative of an error port code outputted therefrom is "a port which has confirmed an occurrence of error".

Structure of the error port code forming circuit 413 shown in connection with the above-described embodiment is merely illustrative but the present invention should not be limited only to this. Basically, any structure, of course, may be employed for the error port code forming circuit 413, if it is proven that signal protocols as shown in FIGS. 8 and 9 or signal protocols similar those in the drawings are practically assured.

In addition, structure of the node controllers 41 to 4n shown in connection with the respective embodiments as described above (FIG. 1, FIG. 4 and FIG. 7) is merely illustrative but the present invention should not be limited only to this. Alternatively, any other structure may be employed for the node controllers 41 to 4n, if it is proven that signal protocols corresponding to the respective node controllers are practically assured.

For example, according to these embodiments, the stop code detecting circuit 406 is disposed rearward of the data converting circuit 405 thereby to detect a stop code from the signal row having sensor data added thereto or having actuator control data removed therefrom. However, in a case where a data row length of the data row does not vary when data are added or removed by the data converting circuit 405 (i.e. in a case where a data row length does not vary even by employing dummy data or the like medium), the stop code detecting circuit 406 may be disposed rearward of the input circuit 401 in the same manner as the start code detecting circuit 402 and the error check circuit 403.

The sensors or the actuators to be controlled by the respective node controllers 41 to 4n are not required to be one of the sensors or actuators. Alternatively, they may be plural ones of the sensors or actuators or a mixture of the sensors and the actuators. Structure of the data converting circuit 405 is determined depending on structure of terminal components associated with the node controller to be controlled.

In any one of the aforementioned embodiments, description has been made as to structure of the node controllers and protocols for transmitting signals in a case where the present invention is applied to an apparatus for carrying out serial control wherein the main controller 30 and the node controllers 41 to 4n are serially connected to each other in a loop-shaped configuration in such a manner as shown in FIG. 10. However, in a case where a plurality of sensors are to be controlled by each node controller, the present invention may equally be applied to an apparatus for carrying out serial control wherein the main controller 30 and the node controllers 41 to 4n are serially connected to each other in a so-called daisy fashion with the main controller 30 serving as a final stage. In this case, only the node controller (node controller 41) disposed at the head end of arrangement of the node controllers is added with a function of generating a signal row shown in, e.g., FIG. 11(b) or FIG. 3(b) (i.e., FIG. 2(a)) or FIG. 6(b) (i.e., FIG. 5(a)) or FIG. 8(a). With respect to all other components, the same structure for node controllers and the same protocols for transmitting signals as described above may be employed for the apparatus.

INDUSTRIAL APPLICABILITY

As will be readily apparent from the above description, the present invention provides many advantageous effects as noted below.

(1) The apparatus can reliably inform all necessary node controllers of an occurrence of error without reduction of an operative efficiency for transmitting data in the form of data link.

(2) For the reason as described in the preceding paragraph (1), the apparatus can effectively prevent respective sensors or actuators to be controlled from being incorrectly informed or incorrectly operated.

(3) Each node controller itself does not require any particular address or the like means. Consequently, all components required for the apparatus can be fabricated in common design and dimensions with advantageous effects derived from mass production.

(4) For the reason as described in the preceding paragraph (3), the apparatus does not require any consideration on a signal transmission system when sensors or actuators are added, removed or replaced. Thus, a machine for which the apparatus is arranged can be rebuilt or reconstructed with easiness.

We claim:
1. An apparatus for carrying out serial control, wherein said apparatus includes;
a main controller for centrally controlling data 1 received from a number of sensors or data to be transmitted to a number of actuators and
a plurality of node controllers serially connected to said main controller, each of said node controllers being disposed corresponding to one or plural ones of said sensors or said actuators so that a data signal row including at least an error check code is inputted thereinto, an occurrence of error is monitored with respect to said data signal row based on said error check code, data are transmitted from the node controller to the corresponding sensors or actuators and vice versa and the data signal row is transferred to a next port,
and wherein each node controller includes;
error checking means for detecting an occurrence of error based on an error check code in the inputted data signal row,
error code detecting means for detecting an error code indicative of an occurrence of error, in a case where said error code is added to the data signal row and
error code adding means for adding the error code to the data signal row to be transferred to the next port, when the presence of an output derived from detection by said error checking means or the presence of an output derived from detection by said error detecting means is found.

2. An apparatus for carrying out serial control as claimed in claim 1, wherein each of said node controllers further includes means for adding to the data signal row an error port information which is to be successively added by a quantity of one bit at every time said error port information passes through the node controller from the port where an error has occurred, said error port information being provided in the form of a signal having a specific logic with one bit as an unit to be added subsequent to the error code.

3. An apparatus for carrying out serial control as claimed in claim 1, wherein each of said node controller further includes means for adding to the data signal row an error port information which is to be successively added from the least significant bit, means for providing said error port information in the form of a code information to be added subsequent to the error code, said error port information having a logical structure of such a type that means are provided for subjecting it to binary addition by a quantity of 1 at every time it passes through the node controller from the port where an error has occurred.

* * * * *